(12) United States Patent
Wilson

(10) Patent No.: US 8,740,267 B1
(45) Date of Patent: Jun. 3, 2014

(54) DEPLOYABLE TANKER TRUCK BARRIER

(71) Applicant: Tony C. Wilson, Simsboro, LA (US)

(72) Inventor: Tony C. Wilson, Simsboro, LA (US)

( * ) Notice: Subject to any disclaimer, the term of this patent is extended or adjusted under 35 U.S.C. 154(b) by 0 days.

(21) Appl. No.: 13/777,657

(22) Filed: Feb. 26, 2013

(51) Int. Cl.
*B60Q 1/50* (2006.01)

(52) U.S. Cl.
USPC ............... 293/22; 116/28 R; 404/6; 404/9

(58) Field of Classification Search
USPC ............ 293/21, 22, 103, 114, 119, 126, 128; 280/762, 764.1, 770; 116/28 R; 340/908; 404/6, 9; 296/1.04
See application file for complete search history.

(56) References Cited

U.S. PATENT DOCUMENTS

| | | | |
|---|---|---|---|
| 2,834,314 A | 5/1958 | Moore | |
| 3,782,322 A | 1/1974 | Wilson | |
| 3,788,268 A * | 1/1974 | Hiatt et al. | ........... 116/28 R |
| 4,825,192 A * | 4/1989 | Wells | ................. 340/433 |
| 5,497,304 A | 3/1996 | Caine | |
| 5,518,283 A * | 5/1996 | Egelske | ................ 293/128 |
| 6,213,047 B1 * | 4/2001 | Means et al. | ........... 116/28 R |
| 6,652,182 B1 * | 11/2003 | Ellefson | .................... 404/9 |
| 7,077,440 B1 * | 7/2006 | Morales et al. | ........... 293/128 |
| 7,217,061 B2 | 5/2007 | Stratton | |
| 7,690,858 B1 * | 4/2010 | Chiavola | .................... 404/6 |
| 7,841,269 B1 * | 11/2010 | Jacobs | ................ 89/36.08 |
| 8,087,443 B2 | 1/2012 | Snyder et al. | |
| 8,118,250 B1 * | 2/2012 | Helseth et al. | ........... 242/396.5 |
| 8,610,598 B2 * | 12/2013 | Hider et al. | ........... 340/932.2 |
| 2003/0164485 A1 | 9/2003 | Olson et al. | |
| 2012/0111261 A1 * | 5/2012 | Schmitt et al. | ........... 116/28 R |

FOREIGN PATENT DOCUMENTS

| | | |
|---|---|---|
| CA | 2753751 | 12/2009 |
| CN | 2471624 | 1/2002 |
| CN | 201553117 | 8/2010 |

* cited by examiner

*Primary Examiner* — Glenn Dayoan
*Assistant Examiner* — Gregory Blankenship

(57) ABSTRACT

A safety barrier for a fuel truck is disclosed. The barrier consists of a pair of side rails hingedly attached to the truck where they may be deployed perpendicularly from its side. The rails include support legs and further include front rails that are deployed generally parallel to the sides of the fuel truck to provide a physical and visual barrier when the fuel truck is dispensing its load. Additionally, the barrier may include a plurality of LED devices connected to the power supply in the truck to enhance the visibility of the barrier.

7 Claims, 11 Drawing Sheets

DEPLOYABLE TANKER TRUCK BARRIER

BACKGROUND OF THE INVENTION

1. Field of the Invention

Figure 1:
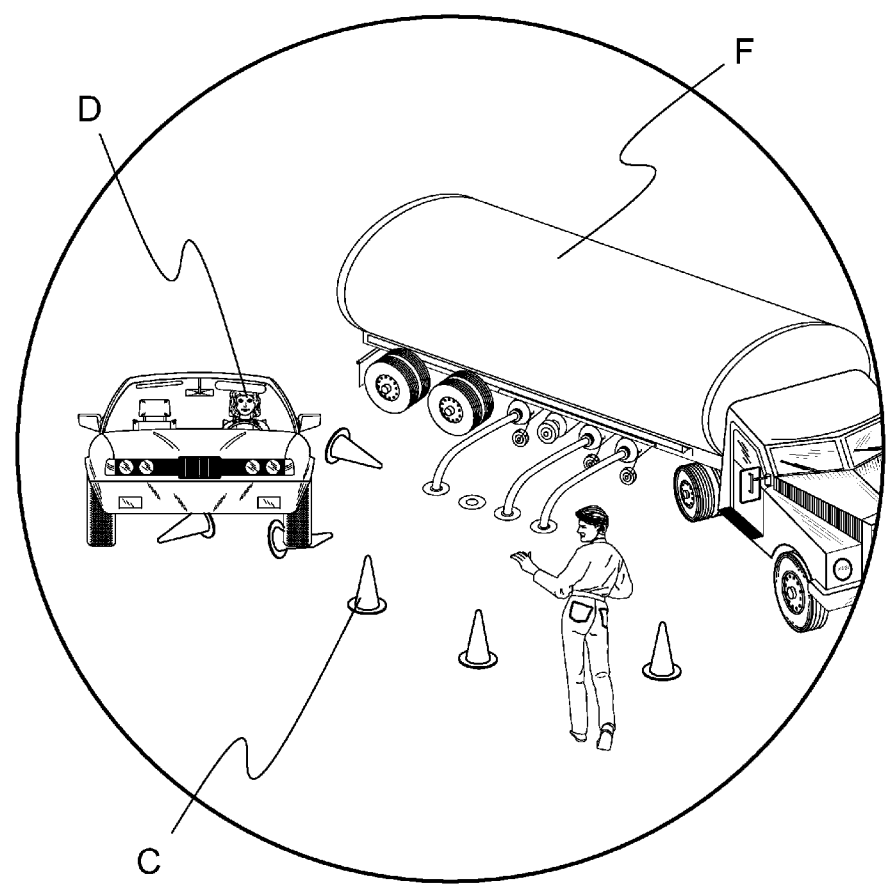

The present invention relates generally to barriers and, more specifically, to barriers for fuel tanker trucks that can be deployed during the filling of underground storage tanks. Typically a drop hose is connected between the truck and underground fuel tank with the truck operator placing traffic cones around the drop location to warn and deter motorists from driving over the hoses or valves, which doesn't always work because the motorist may not see the cones.

The present invention provides a deployable barrier that can be installed at time of truck manufacture or as an after market retrofit to existing tanker trucks.

2. Description of the Prior Art

There are other barriers provided for trucks. While these barriers may be suitable for the purposes for which they where designed, they would not be as suitable for the purposes of the present invention as heretofore described.

It is thus desirable to provide a deployable barrier that will cordon off an area between the fuel tanker truck and the underground fill port.

It is further desirable to provide a barrier with an opening whereby an operator may quickly exit the barricaded area if the need arises.

SUMMARY OF THE PRESENT INVENTION

A primary object of the present invention is to provide an articulated deployable barrier for one side of a fuel dispensing truck.

Another object of the present invention is to provide an articulated deployable barrier that is pivotally attached to said fuel truck.

Yet another object of the present invention is to provide an articulated deployable barrier having longitudinal rails that are selectively extendable from a truck stored position to a truck deployed position.

Another object of the present invention is to provide an articulated deployable barrier wherein said longitudinal rails when extended form spaced apart substantially right angled barriers extending approximately the length of the tanker portion of said fuel truck.

Still yet another object of the present invention is to provide a deployable barrier wherein said longitudinal rails each has a pivotal rail approximate its distal end that when extended serves as ground engaging support for said longitudinal rail.

Another object of the present invention is to provide a deployable barrier wherein said longitudinal rails have hinged rails fastened to their distal ends.

Yet another object of the present invention is to provide a deployable barrier where the hinged rails when extended leave an opening between their ends providing an opening for the fuel tank operator to pass through freely.

Still yet another object of the present invention is to provide a deployable barrier that creates a fence encompassing the truck's fuel dispensing ports, hoses and station fuel drop ports.

Another object of the present invention is to provide a deployable barrier having a plurality of reflective elements mounted to the barrier rails.

Yet another object of the present invention is to provide a deployable barrier having a plurality of illuminable elements mounted to the barrier rails.

Still yet another object of the present invention is to provide a deployable barrier where the illuminable elements are in electrical communication with the tanker truck electrical system.

Another object of the present invention is to provide a deployable barrier having a contact switch to automatically activate the illuminable elements when the longitudinal rails are deployed.

Additional objects of the present invention will appear as the description proceeds.

The present invention overcomes the shortcomings of the prior art by providing a safety barrier comprised of deployable side rails fixedly attached to the truck with the terminal ends of the side rails having a deployable front rail with each rail having a pivotal support leg. The exterior surface of the barrier further provides for a luminescent application of a reflective film or paint.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

Referring to FIG. 1, shown is an illustrated view of prior art.

Figure 2:
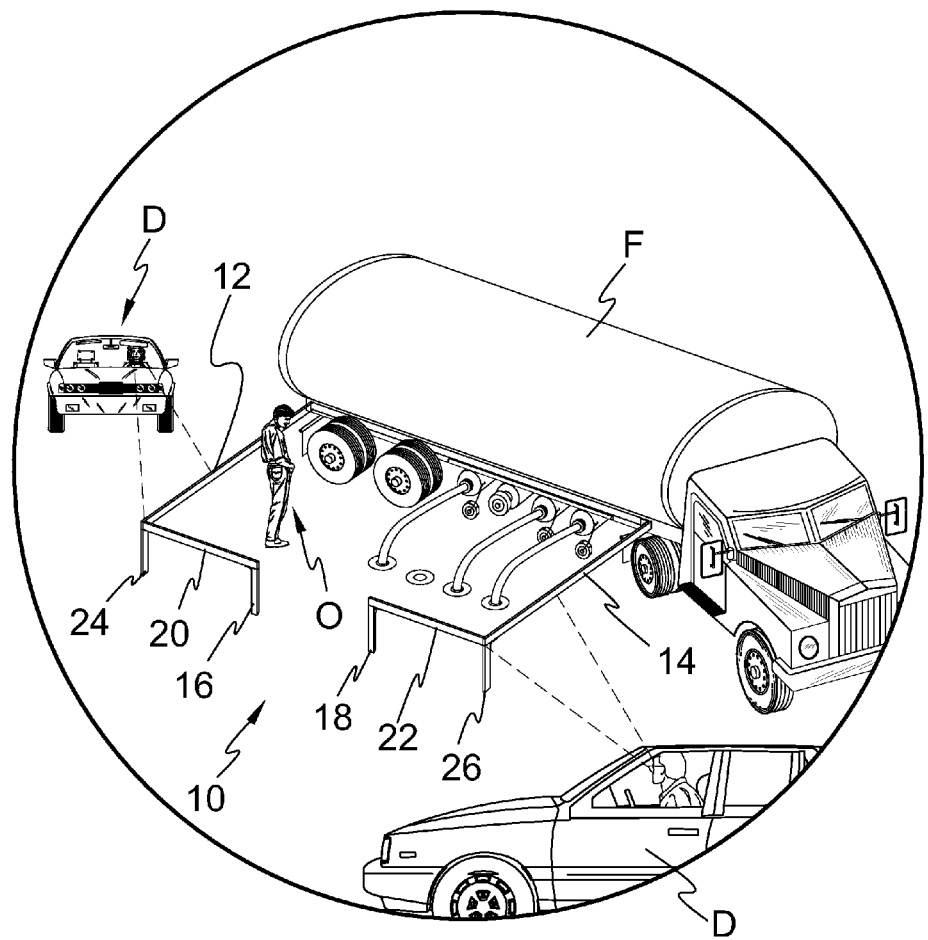

Referring to FIG. 2, shown is an illustrative view of the fuel truck drop barrier of the present invention.

Figure 3:
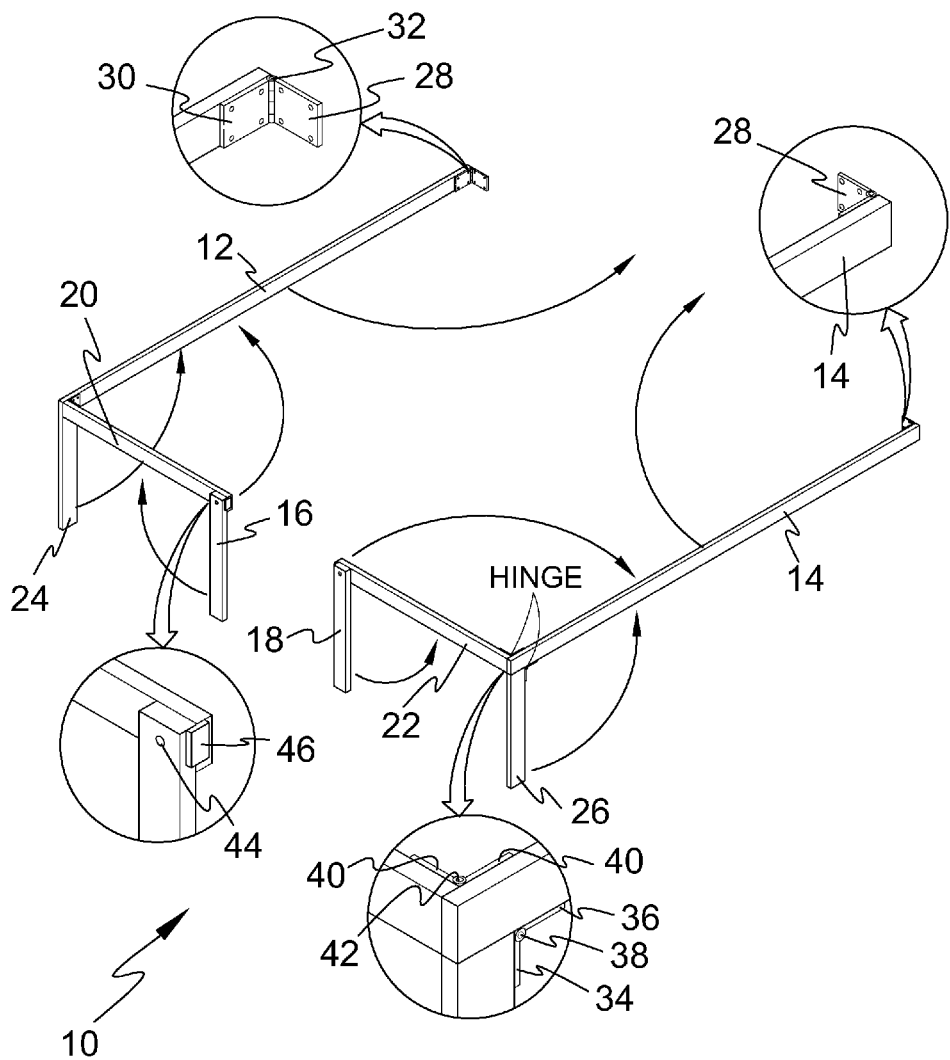

Referring to FIG. 3, shown is a perspective view of the fuel truck deployable barrier of the present invention.

Figure 4:
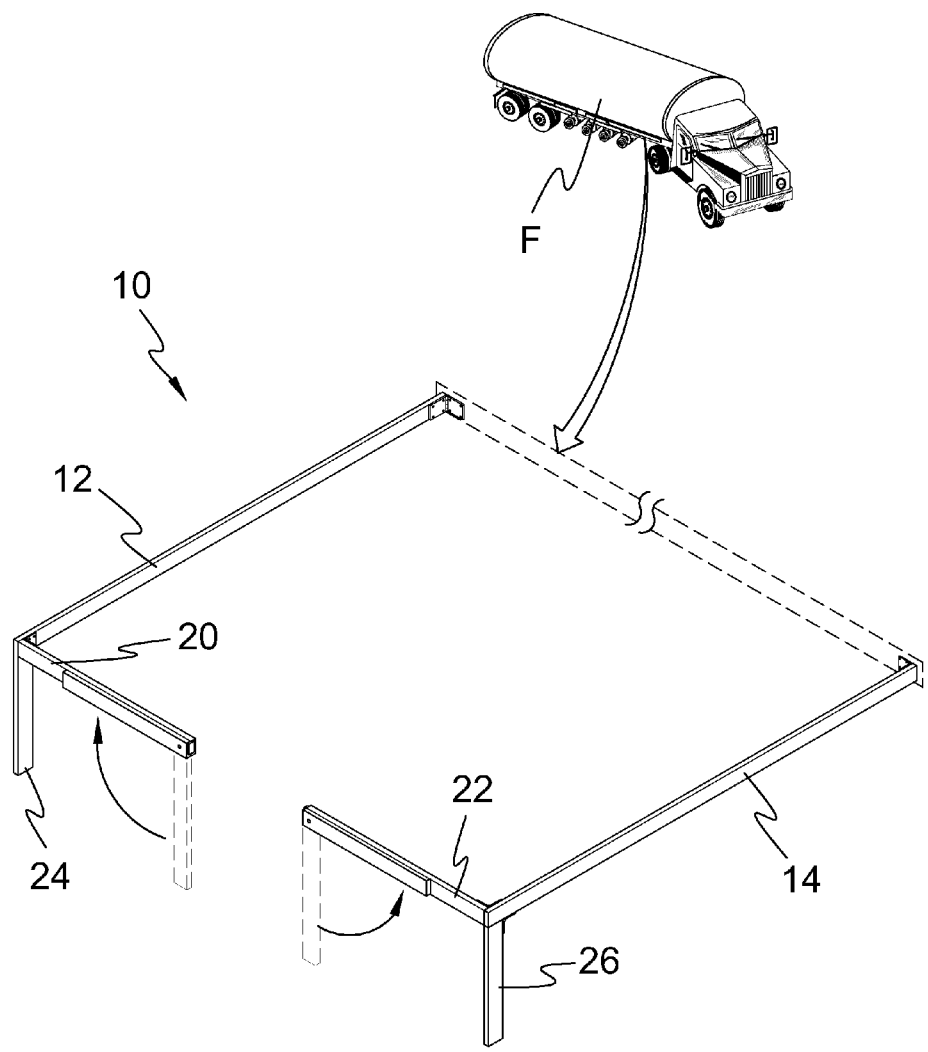

Referring to FIG. 4, shown is a perspective view of the deployed safety barrier for fuel trucks.

Figure 5:
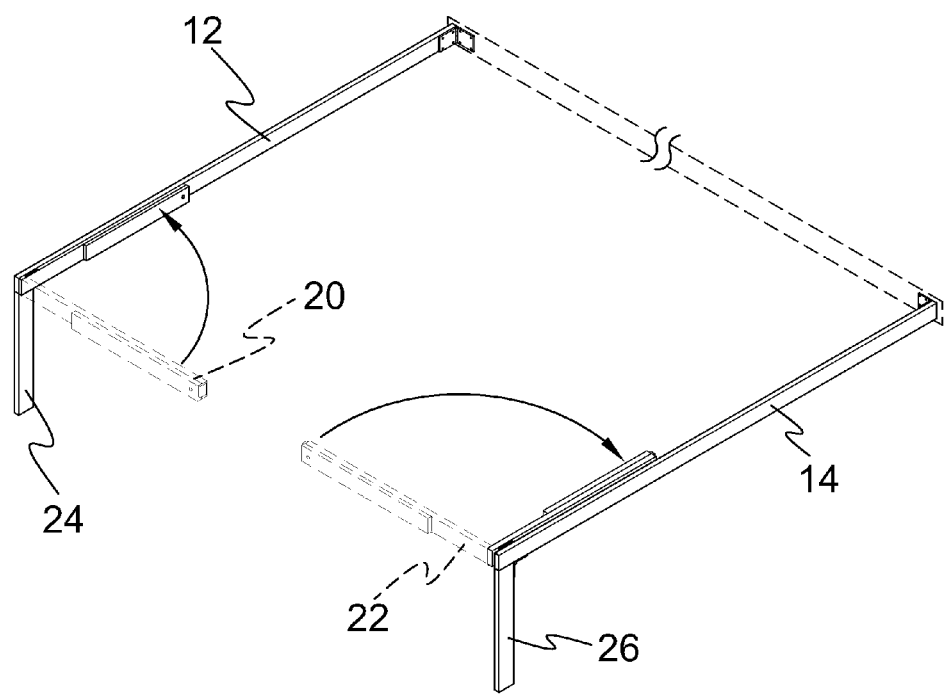

Referring to FIG. 5, shown is a perspective view of the fuel truck deployable barrier of the present invention.

Figure 6:
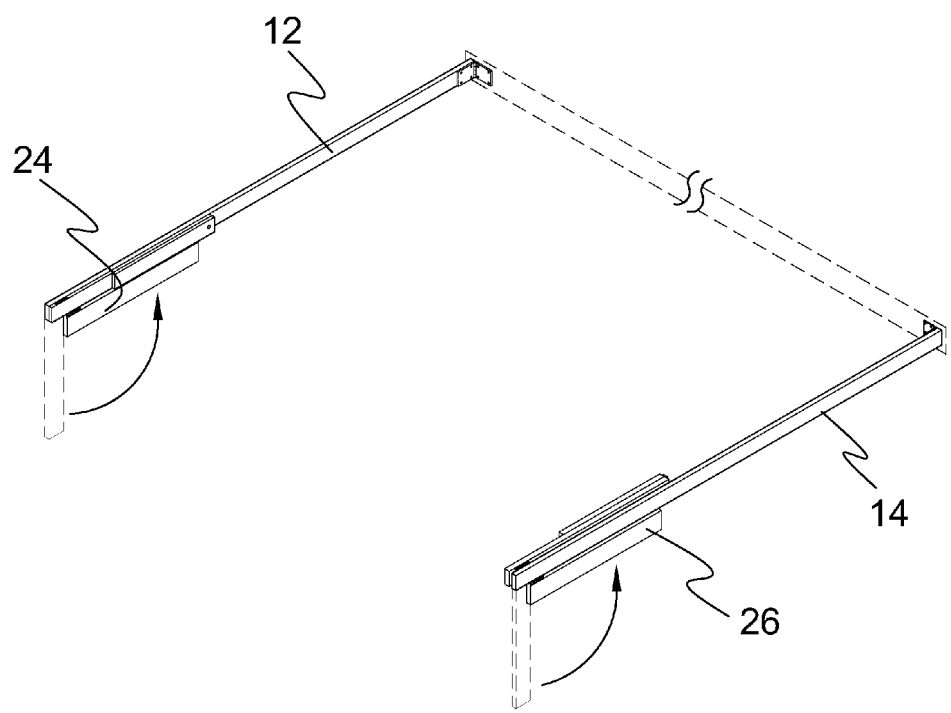

Referring to FIG. 6, shown is a perspective view of the fuel truck deployable barrier of the present invention.

Figure 7:
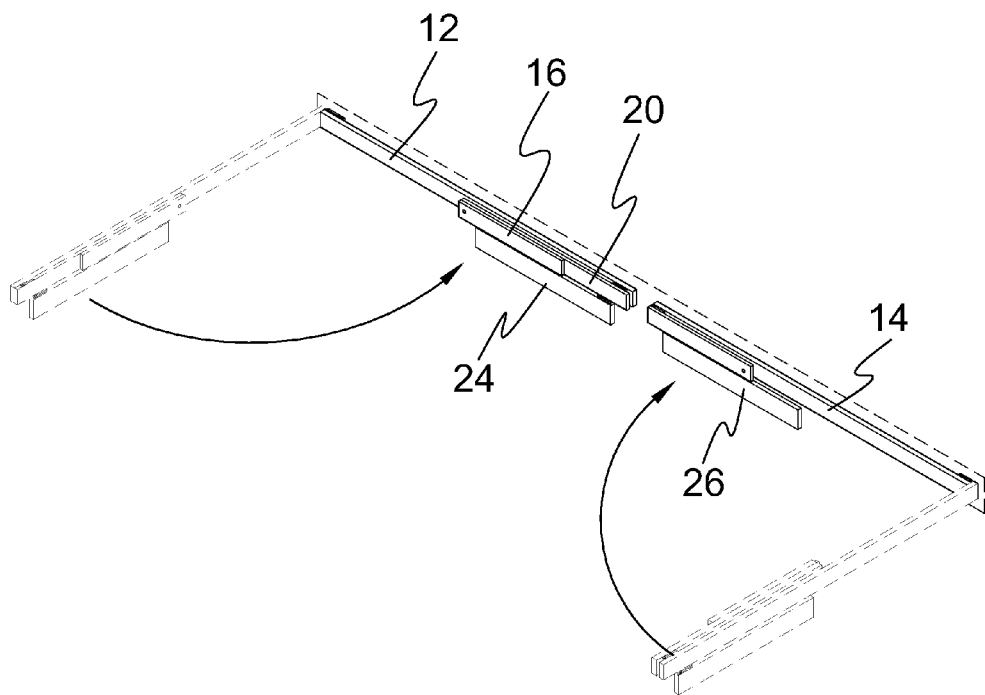

Referring to FIG. 7, shown is a perspective view of the fuel truck deployable barrier of the present invention.

Figure 8:
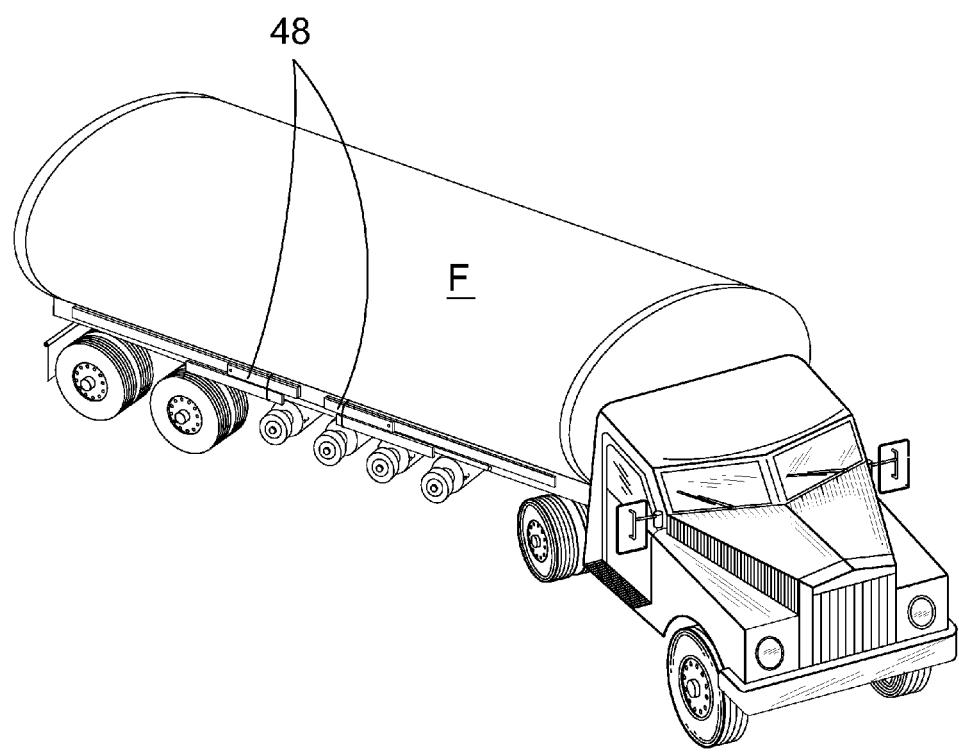

Referring to FIG. 8, shown is a perspective view of the fuel truck deployable barrier of the present invention.

Figure 9:
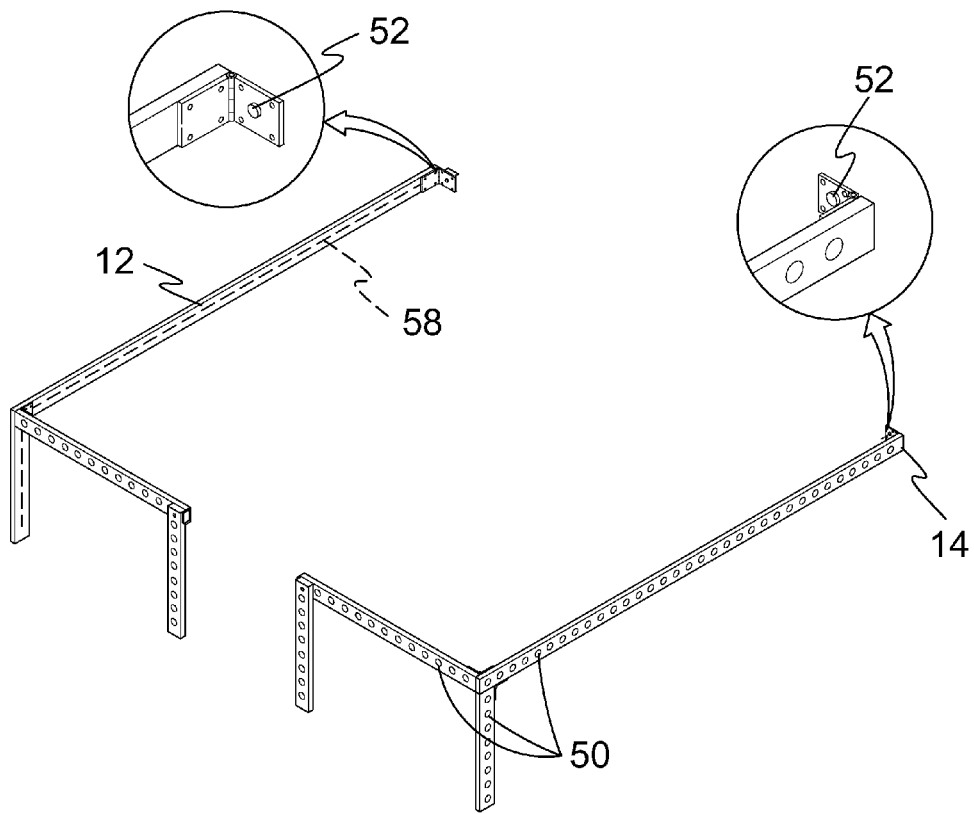

Referring to FIG. 9, shown is an additional element of the safety barrier of the present invention.

Figure 10:
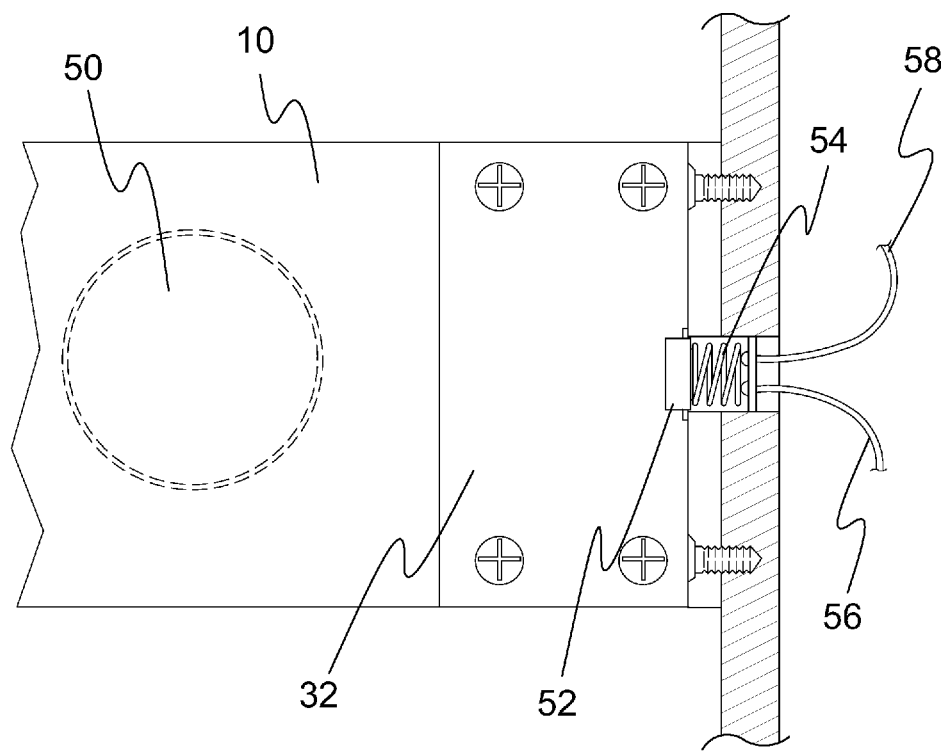

Referring to FIG. 10, shown is an illustrative view of an open contact switch to energize the plurality of LEDs.

Figure 11:
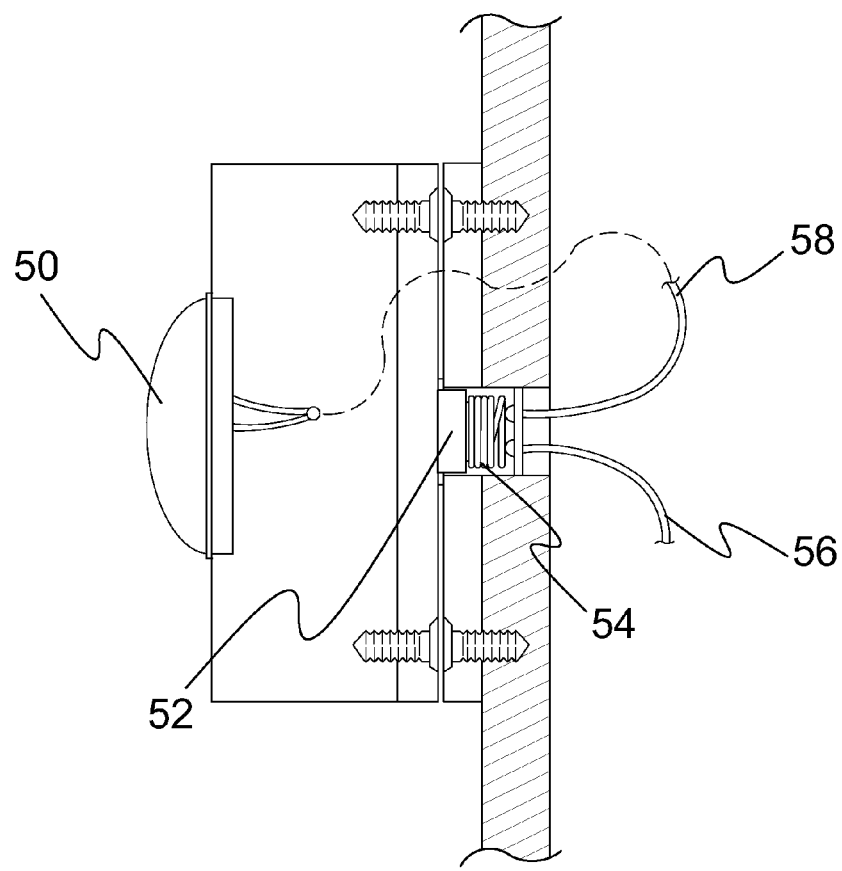

Referring to FIG. 11, shown is an illustrative view of a closed contact switch to de-energize the plurality of LEDs.

DESCRIPTION OF THE REFERENCED NUMERALS

Turning now descriptively to the drawings, in which similar reference characters denote similar elements throughout the several views, the figures illustrate the use of the present invention. With regard to the reference numerals used, the following numbering is used throughout the various drawing figures. fuel truck drop barrier 12, 14 side rails
16, 18 pivot legs
20, 22 front rails
24, 26 side rail support legs
28 truck attachment plate
30 side rail attachment plate
32 truck attachment hinge
34, 36 side rail support leg plates
38 support leg hinge
40 front rail plates
42 front rail hinge
44 pivot leg pin
46 stop plate
48 elastomeric attachment cord
50 LED
52 contact switch
54 switch spring
56 truck power source
58 LED power supply

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrated view of prior art. When fuel delivery trucks F do fuel dropping, safety cones C are placed around the perimeter of the dropping zone. Many times vehicles run over the cones because the driver (indicated at D in this and other Figures) does not see them placed on the ground.

The present invention over comes this problem by providing a fuel truck safety barrier that is clearly visible to drivers of other vehicles.

Referring to FIG. 2, shown is an illustrative view of the fuel truck drop barrier of the present invention. The present invention is a fuel delivery truck safety barrier 10 that is pivotally attached to the body of the truck and is manually deployable by the fuel truck operator O when dropping a load of fuel. The barrier is comprised of side rails 12, 14; front folding pivot legs 16, 18; hinged front rails 20, 22; and side rail support legs 24, 26.

Referring to FIG. 3, shown is a perspective view of the fuel truck barrier of the present invention. Shown is the fuel delivery truck safety barrier 10 of the present invention comprising a folding safety barrier that is pivotally attached to the body of the truck and is selectively deployed by the fuel truck operator O upon delivery of fuel. The safety barrier is comprised of deployable side rails 12, 14 fixedly attached to the truck F with the terminal ends of the side rails 12, 14 each having a deployable front rail indicated at 20 and 22 with each rail having a pivotal support leg 16, 18. The exterior surface of the barrier further provides for a luminescent application of a reflective film or brightly colored paint such as hunter orange or the like. Attachment to fuel truck F is accomplished by means of truck attachment plate 28, side rail attachment plate, and deployment is enabled by truck attachment hinge 32. The side rail support legs are enabled by side rail support leg plates 34, 36 and support leg hinge 38. Finally, the pivot legs 16, 18 are deployed by means of the pivot leg pin 44 and stop plate 46.

Referring to FIG. 4, shown is a perspective view of the deployed safety barrier for fuel trucks. Shown is the fuel delivery truck safety barrier 10 of the present invention deployed. The safety barrier has strapping or latching means, such as elastomeric cord, for anchoring the safety barrier to the truck while in its stored state, as shown in FIG. 8. Each of the side rails 12, 14 is fixedly attached to the truck by means of the attachment plates 28, 30 (as seen in FIG. 3) and deployable to a substantially right angle in relation to the truck F's side (as shown in FIG. 7) wherethen the side rail support legs 24, 26 are deployed as is shown in FIG. 6 along with the front rail portions 20, 22 and the front rail support legs 24, 26. The front rails 20, 22 when extended provide a protected area with an unobstructed opening for the operator O to move into and out of the protected area as needed.

Referring to FIG. 5, shown is a perspective view of the fuel truck barrier of the present invention. Shown is the safety barrier 10 being folded to its storage position. The barrier is a safety barrier having a left hand 14 side and a right hand side 12 that are independently manually deployable to an open state with each side rail substantially positioned at a right angle to the fuel truck's side when fully deployed. The side rails 12, 14 each provide a terminus end support leg 24, 26 and hingedly attached front rail portions 20, 22 also each having a support leg 16, 18 on the terminal end of each front rail portion. As shown, the safety barrier front portion and respective front portion support leg are pivoted to their stored state against a respective side rail. The side rail support leg is pivotally moved to its stored state under its respective side rail then the side rail is pivotally moved to its stored state against the fuel truck whereby an elastic cord indicated at 48 in FIG. 8 is used to anchor the safety barrier 10 in its stored state to the fuel truck F.

Referring to FIG. 6, shown is a perspective view of the fuel truck deployable barrier of the present invention. Shown is a continuation of the folding process for moving the fuel truck safety barrier from an open state to a closed state. The safety barrier front portions 20, 22 and respective pivot legs 16, 18 are pivoted to their stored state against a respective side rail 12, 14. The side rail support leg 24, 26 is moved to its stored state under its respective side rail then the side rail is swung as indicated by the arrows in the various Figures to its stored state against the fuel truck F wherethen an elastic cord 48 is used to anchor the safety barrier 10 in its stored state to the fuel truck.

Referring to FIG. 7, shown is a perspective view of the fuel truck deployable barrier of the present invention. Shown is a continuation of the folding process for moving the fuel truck safety barrier from an open state to a closed state. The safety barrier front rails 20, 22 and respective pivot legs 16, 18 are moved to their stored state against their respective side rail. The side rail support legs 24, 26 are moved to their stored states (seen in FIG. 6) under their respective side rails then the side rails 12, 14 are moved to their stored states against the fuel truck wherethen an elastic cord 48 is used to anchor the safety barrier 10 to the fuel truck.

Referring to FIG. 8, shown is a perspective view of the fuel truck deployable barrier of the present invention. Shown is a continuation of the folding process for moving the fuel truck safety barrier 10 from an open state to a closed state. The safety barrier front rails 20, 22 and respective pivot legs 16, 18 are moved to their stored state against a respective side rail. The side rail support leg is moved to its stored state under its respective side rail then the side rail is pivotally moved to its stored state against the fuel truck wherethen an elastic cord 48 is used to anchor the safety barrier 10 to the fuel truck.

Referring to FIG. 9, shown is an additional element of the safety barrier of the present invention. The present invention alternately provides for a plurality of LEDs 50 in electrically communication with the fuel truck's power source and a plurality of contact switches 52 to illuminate the LEDs 50 when the safety barrier is deployed providing a series of LEDs 50 integrated within the barrier to illuminate providing visibility to approaching vehicles.

Referring to FIG. 10, shown is an illustrative view of an open contact switch to energize the plurality of LEDs 50. Shown is a sectional view of an enablement of an additional element comprising a plurality of LEDs 50 incorporated into the safety barrier 10 and switch means 52 for activating the barrier's LED illumination during deployment providing visibility to approaching vehicles and deactivating the LEDs 50 when the barrier is folded to its stored position. The contact switch 52 is operated by a spring 54 and is connected to both the truck's power supply as indicated at 56 and also to the LEDs as indicated at 58.

Referring to FIG. 11, shown is an illustrative view of a closed contact switch to de-energize the plurality of LEDs 50. shown is a sectional view of an enablement of the additional element of the safety barrier of the present invention in a deactivated position within the folded frame that is pivotally attached to the body of the truck F, having micro switches 52 mounted within the hinges of the main hinge assembly 32 so that when the barrier 10 is folded, the switch 52 is deactivated, shutting off the series of LEDs 50 integrated within the barrier 10 and designed to light up when the safety barrier 10 is deployed.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A safety barrier to be deployed from a fuel truck comprising:
    side rails hingedly attached to the fuel truck, said side rails including support legs depending therefrom, said side rails disposed perpendicularly from the side of the truck when in the deployed position, said support legs including pivot means to engage the ground surface;
    front rails hingedly attached to each of said side rails such that in a deployed position said front rails are substantially parallel to the side of the truck, and where said front rails further include pivoting legs at the distal end thereof such that said pivoting legs when deployed engage the ground surface whereby
said safety barrier may be extended from the side of the fuel truck to enclose a predetermined area, said barrier disposed above the surface of the ground and supported by said deployed pivoting legs and said deployed side rail support legs while the truck is dispensing fuel into a storage tank.

2. The safety barrier as claimed in claim 1 where said side rails and said front rails include a reflective surface.

3. The safety barrier as claimed in claim 1 where said side rails and said front rails are brightly colored to increase visibility.

4. A safety barrier to be deployed from a fuel truck comprising:
    side rails hingedly attached to the fuel truck, said side rails including support legs depending therefrom, said side rails disposed perpendicularly from the side of the truck when in the deployed position, said support legs including pivot means to engage the ground surface;
    front rails hingedly attached to each of said side rails such that in a deployed position said front rails are substantially parallel to the side of the truck, and where said front rails further include pivoting legs at the distal end thereof such that said pivoting legs when deployed engage the ground surface;
    a plurality of LED devices disposed on said side rails and said front rails;
    power supply means from the fuel truck such that said LED devices may be illuminated when desired; whereby
said safety barrier may be extended from the side of the fuel truck to enclose a predetermined area, said barrier disposed above the surface of the ground and supported by said deployed pivoting legs and said deployed side rail support legs while the truck is dispensing fuel into a storage tank.

5. The safety barrier as claimed in claim 4 where said hingedly attached side rails further include a contact switch located proximate said hinge such that when said side rails are deployed perpendicularly from the fuel truck, said LED devices are provided with power and thus are illuminated.

6. The safety barrier as claimed in claim 4 where said side rails and said front rails include a reflective surface.

7. The safety barrier as claimed in claim 4 where said side rails and said front rails are brightly colored to increase visibility.

\* \* \* \* \*